United States Patent [19]

Buckingham et al.

[11] Patent Number: 5,168,031
[45] Date of Patent: Dec. 1, 1992

[54] OPTICAL RECORDING ELEMENTS

[75] Inventors: Mark R. Buckingham; Christopher M. Evans; Richard J. Ellis, all of Essex; Andrew C. Jackson, Leeds, all of Great Britain

[73] Assignee: Minnesota Mining and Manufacturing Company, St. Paul, Minn.

[21] Appl. No.: 693,380

[22] Filed: Apr. 30, 1991

[51] Int. Cl.$^5$ .................... G11B 7/24; C09B 47/04
[52] U.S. Cl. .................... 430/270; 430/495; 430/945; 346/76 L; 346/135.1
[58] Field of Search ............ 430/270, 495, 945; 540/122, 129; 346/76 L, 135.1

[56] References Cited

U.S. PATENT DOCUMENTS

| H477 | 6/1988 | Barges et al. | 540/140 |
|---|---|---|---|
| 4,551,413 | 11/1985 | Bell | 430/270 |
| 4,798,781 | 1/1989 | Hirose et al. | 430/270 |
| 4,800,145 | 1/1989 | Nelson et al. | 430/58 |
| 4,946,762 | 8/1990 | Albert et al. | 430/270 |

FOREIGN PATENT DOCUMENTS

| 0186404 | 2/1986 | European Pat. Off. |
| 61-246091 | 11/1986 | Japan . |
| 63-149189 | 6/1988 | Japan . |

Primary Examiner—Charles L. Bowers, Jr.
Assistant Examiner—John A. McPherson
Attorney, Agent, or Firm—Gary L. Griswold; Walter N. Kirn; Mark A. Litman

[57] ABSTRACT

An optical recording element comprising a substrate and as a recording medium a layer comprising a dye having a nucleus of general formula (I):

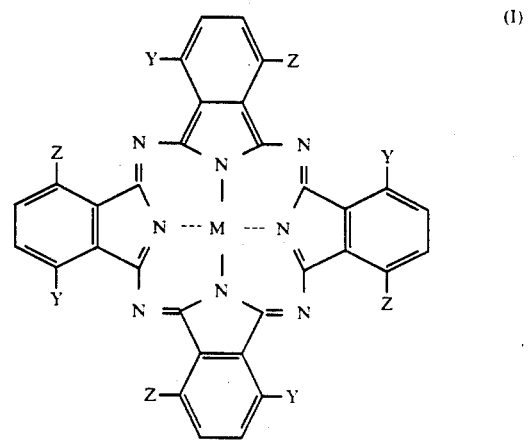

wherein:
each Y and Z is independently selected from the group consisting of hydrogen and —XR wherein X is selected from the group consisting of S, Se and Te and R represents an organic radical; with the proviso that one and only one of Y and Z on each phenyl ring must be other than H, and
M is selected from the group consisting of two hydrogen atoms, metals and metal oxides.

14 Claims, 1 Drawing Sheet

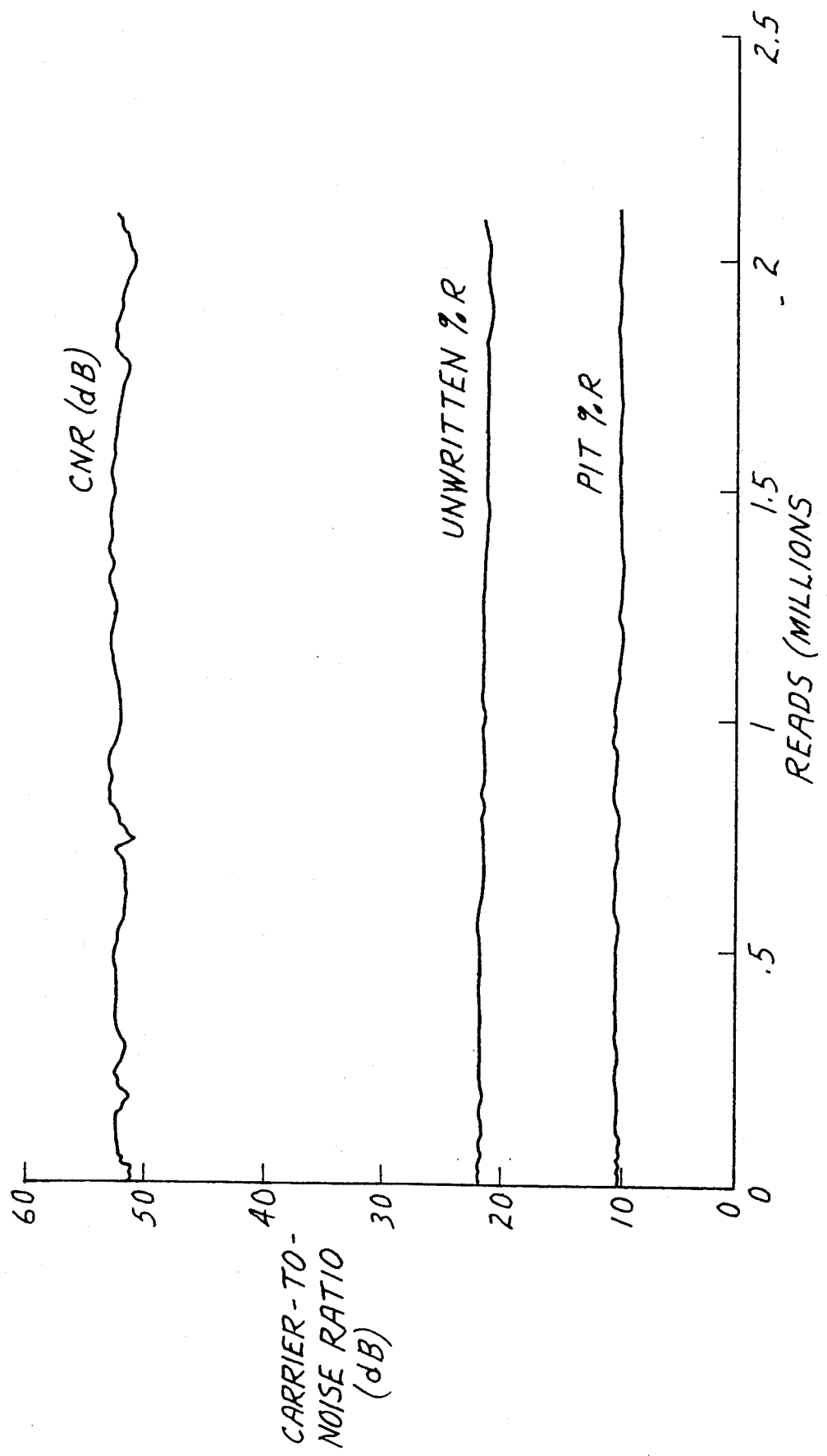

OPTICAL RECORDING ELEMENTS

FIELD OF THE INVENTION

This invention relates to optical data storage media and in particular to an optical recording element in which information can be recorded and read by means of laser light, the element having a recording layer comprising a class of phthalocyanine dyes absorbing at near-infrared wavelengths.

BACKGROUND TO THE INVENTION

Continuing advances in information handling technology have led to the requirement for data storage and retrieval systems capable of processing extremely large volumes of information. A proposed method for satisfying this demand is that of optical recording, and in particular optical disk recording, which allows recording and accessing of information at very high data rates with a much greater recording density and archivability than is possible with available magnetic recording systems.

A highly focussed laser beam is used to record and recover the information on the optical recording media. The selection and alignment of diode lasers into an optical recording system is described by Bartolini et al in IEEE Journal of Quantum Electronics, p.69, 1981, and both read and write apparatus are disclosed in British Patent Application No. 2 016 747A.

Several different systems have been examined in an attempt to develop the ideal laser recording system, although, the use of recording media comprising thin metal films, as disclosed by Lou et al, J.Vac.Sci.Technol., 18, p.78, (1981), is currently the system which is most widely commercially available. However, optical recording media comprising a recording layer of an organic dye are much less expensive to manufacture and are increasingly more attractive, providing suitable materials can be found. Additionally organic dye based optical recording systems do not constitute as significant an environmental hazard as certain metal based systems.

As well as providing advantages of cost and low toxicity, the thermal properties of organic compounds are generally superior to those of metals since they possess lower thermal conductivities and more appropriate melting/decomposition temperatures. In dye based optical recording systems it is important that the absorption/reflection spectrum of the dye corresponds as closely as possible with the emission of the recording laser. Of the various lasers available, semi-conductor laser diodes have advantages over conventional gas lasers, of low cost and compact size, and possibility of signal modulation. The problem is, therefore, one of finding organic materials which have all the requisite physical properties and which absorb strongly in the region compatible with laser diodes, the majority of which emit in the near infrared between 800 and 850nm.

The preferred method of fabricating optical recording media utilising an organic dye as the light absorber is by a solvent coating technique such as spin coating and accordingly suitable dyes must possess some solubility in suitable solvents.

In one construction known as air incident (AI), the dye layer is coated onto a reflectorized substrate. Typically, the reflectivity is provided by an evaporated film of a metal such as aluminium. During recording, portions of the dye layer are ablated by an air-incident intensity modulated laser beam, thereby exposing portions of the reflective metal film and recording data as a reflectivity pattern.

The current trend within the optical recording industry is to move toward an air sandwich optical disk construction, as described by G. Bouwhuis et al in Principles of Optical Disc Systems, pub. Adam Hilger Ltd, pp. 213-214, (1985). In this type of construction the laser beam passes through the substrate before striking the dye layer, a construction commonly referred to as substrate incident (SI).

Several classes of organic dyes have been proposed for use in optical recording media of the types described above and are discussed by Kuder in J. Im. Technol., 12, p.140 (1986). However, known dyes have failed to meet all of the strict requirements demanded of optical recording media. The reasons for failure are varied, but include thermal and/or photochemical instability, poor solubility in suitable solvents and low light absorption.

The use of vapour-coated phthalocyanines in optical recording media is known and disclosed, for example, in U.S. Pat. Nos. 4 241 355 and 4 298 975. The dyes claimed in these patents cannot be used to form a solvent-coatable recording media, being insoluble in useful organic solvents.

Hereinafter, the abbreviation PcM is used to denote the phthalocyanine nucleus:

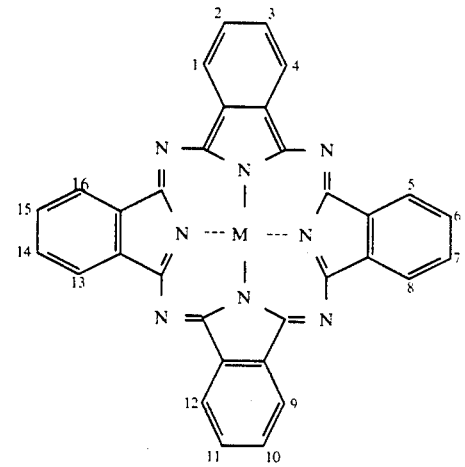

in which:

M represents 2 hydrogen atoms, a metal or metal oxide. Of the peripheral carbon atoms available for substitution, substitution positions numbered 1, 4, 5, 8, 9, 12, 13 and 16 are designated the ortho positions, and those positions numbered 2, 3, 6, 7, 10, 11, 14 and 15 the meta positions.

(t-Butyl)$_{1.4}$ PcVO, a soluble derivative of vanadyl phthalocyanine, is known to precipitate primarily as a non-IR absorbing glassy solid (phase I) when spin-coated with a vinyl chloride-vinyl acetate copolymer from 1,1,2-trichloro ethane (Law, J. Phys. chem., 89 p.2652 (1985). It has been found that exposure of this solid to a solvent vapour, preferably ethyl acetate, results in crystallization inside the polymer matrix to an IR-absorbing phase II, see U.S. Pat. No. 4 529 688.

German Patent Application No. 3446418 discloses an optical recording medium comprising a substrate supporting a light-absorbing layer containing an amino-substituted phthalocyanine dye which has a strong absorption between 650 and 800 nm, and which can be coated either from solution or by vacuum deposition. It has been found that many amino-substituted phthalocyanines invariably have poor thermal stability.

European Patent Application No. 0 186 404 discloses an optical recording medium comprising a substrate supporting an optically deformable film containing a phthalocyanine dye in which at least 5, and preferably 8, of the peripheral carbon atoms in the ortho positions of the phthalocyanine nucleus are linked by a Group V B or Group VI B atom to a carbon atom of an organic radical.

Japanese Patent No. 61-246091 broadly discloses an optical recording medium having a recording layer of a phthalocyanine dye in which between 1 and 16 of the peripheral carbon atoms are linked by nitrogen or a Group VI B atom to an organic radical. The preferred number of substituents is stated to be between 3 and 16 although in all of the optical recording media disclosed the dyes possess at least 7 substituents.

Japanese Patent Application No. 63-149189 discloses an optical recording medium comprising a substrate supporting a recording layer comprising a class of phthalocyanine dyes, in which at least 3 to a maximum of 8 of the peripheral carbon atoms bear a substituent. From 1 to 4 of these substituents are organic radicals bonded through a group VB or VIB atom, while the remainder (if any) are organic radicals bonded through carbon. The substitution patterns are undefined, except that it is preferred that substituents of a particular type are in an uneven distribution around the periphery. Thus, the compound

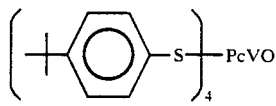

is disclosed, but the position of the arylthio substituents is not defined. The wavelength of maximum absorption ($\lambda$max) for this compound is quoted as 818 nm.

Japanese Patent No. 63-312888 discloses an optical recording element comprising a substrate supporting a recording layer comprising a class of phthalocyanine dyes, in which 4 of the peripheral carbon atoms in the meta positions of the phthalocyanine nucleus are linked by a S atom to a carbon atom of a $C_{1-20}$ straight chain alkyl group.

There has now been found a further class of substituted phthalocyanine dyes which possess particularly desirable properties for use in optical recording media.

BRIEF SUMMARY OF THE INVENTION

According to the present invention there is provided an optical recording element comprising a substrate and as a recording medium a layer comprising a dye having a nucleus of general formula (I):

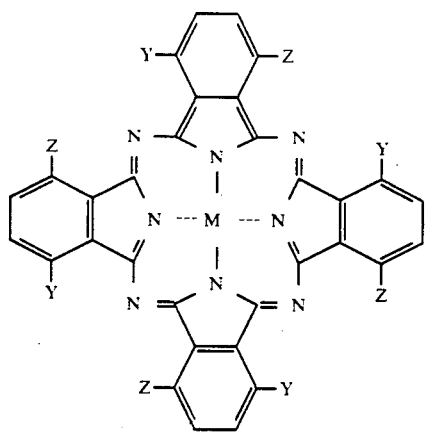

wherein;

each Y and Z is independently selected from the group consisting of hydrogen and —XR wherein X is selected from the group consisting of S, Se and Te and R represents an organic radical; with the proviso that one and only one of Y and Z on each phenyl ring must be other than H, and M is selected from the group consisting of two hydrogen atoms, metals and metal oxides.

DESCRIPTION OF THE PREFERRED EMBODIMENTS

The phthalocyanine dye nucleus may be metal free, i.e., it may carry two hydrogen atoms at the centre of the nucleus, or it may be complexed with a metal or metal oxide. The phthalocyanine dye nucleus may carry one or two metal atoms or metal oxides complexed within the centre of the nucleus. Examples of suitable metals and metal oxides include Cu, Ni, Pb, VO, TiO, Nb, Ta, Pd, Sn, Cr, Mn, Fe and Co. Preferred metals and metals oxides are Mn and VO.

In the compounds of the invention, one of Y and Z on each phenyl ring of the phthalocyanine nucleus represents a hydrogen atom and the other represents —XR to produce a tetra-substituted dye molecule bearing one XR substituent on each phenyl ring, the XR substituents being attached to positions 1 or 4, 5 or 8, 9 or 12 and 13 or 16 (herein referred to as the ortho positions). Preferably each XR group is the same, so that the dye molecule is symmetrical in the sense that all four phenyl rings bear one identical substituent, although the invention encompasses all the geometrical isomers possible within the above constraints. Such ortho-substituted dyes are found to be advantageous over dyes bearing substituents in the meta positions (2, 3, 6, 7, 10, 11, 14 and 15) in that they possess absorption maxima closer to the output wavelength of currently used laser systems. Generally, dyes possessing meta substituents are found to have a less useful absorption pattern closer to the red region, with maxima below 725 nm. Unsymmetrical dyes as taught in Japanese Patent Application No. 63-149189 show longer wavelength absorptions than those of the present invention, but such compounds are more difficult and costly to synthesise. Furthermore, it is surprisingly found that optical recording elements in accordance with the present invention show write-sensitivities that are comparable with those disclosed in Japanese Patent Application No. 63-149189, despite the poorer match of laser output with absorption maximum.

Preferably each X represents a sulphur atom.

R represents an organic radical. The radical is generally a monovalent, optionally substituted aliphatic, alicyclic or aromatic radical. R preferably represents an optionally substituted aromatic radical as this is found to produce a dye having a higher thermal stability when compared to dyes possessing aliphatic radical substituents.

Suitable aliphatic radicals comprise from 1 to 20 carbon atoms and include both alkyl and alkenyl series, for example, vinyl, butyl, nonyl, dodecyl, octadecyl and octadecenyl groups. In a preferred example, R represents an optionally substituted alkyl group comprising from 4 to 18 carbon atoms. Suitable alicyclic radicals comprise from 4 to 8 carbon atoms and include homocyclic groups such as cyclohexyl.

Suitable aromatic radicals comprise up to 14 ring atoms selected from C, N, O, S and Se, and include both hetero- and homoaromatic groups such as benzene, napthalene and mono- or bicyclic heteroaromatic series. Examples of suitable aromatic radicals include optionally substituted phenyl, napthyl (especially naphth-2-yl), pyridyl, thiophenyl, furyl, pyrimidyl and benzthiazolyl) groups.

Each aliphatic or alicyclic radical may possess one or more substituents selected from; alkoxy and alkylthio groups comprising up to 5 carbon atoms, halogen atoms, cyano moieties and aryl groups comprising up to 10 carbon atoms, especially mono- or bi-homo/heterocyclic groups. Each aromatic radical may possess one or more substituents selected from : alkyl, alkenyl, alkylthio, alkylsulphonamide, alkylsulphone, alkylsulphoxide groups comprising up to 5 carbon atoms; aryl, arylthio, arylsulphonamide, arylsulphone, arylsulphoxide groups comprising up to 10 carbon atoms; aralkyl groups comprising up to 15 carbon atoms; hydroxyl, cyano, carboxyl, nitro moieties and primary, secondary and tertiary amino groups.

Specific examples of substituents include methyl, ethyl, methoxy, athoxy, methylthio, allyl, t-butyl trifluoromethyl, bromine, chlorine, fluorine, phenyl, —COOH,

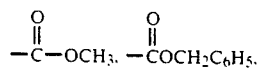

—NHSO$_2$CH$_3$, —SO$_2$C$_6$H$_5$, —NH$_2$, —NHC$_2$H$_5$ and —N(CH$_3$)$_2$.

The particular selection of R groups will depend upon the desired properties of the dye and in particular the solubility properties required. For example, for solubility to the level of about 1% in chlorinated solvents such as dichloromethane or chloroform, R may be an unsubstituted phenyl group. If a higher level of solubility (>2%) is necessary, —R may be t-butylphenyl. For solubility in cyclohexane or similar non-polar solvents, it is preferable for R to be an alkyl chain; chain lengths of as few as 7 carbons and as many as 18 carbons have been shown to be effective.

It has been found that the phthalocyanine dyes of formula (I) possess desirable properties for use as optical recording media which are unexpectedly superior to analogous phthalocyanines in which X is oxygen or nitrogen and phthalocyanines having a greater number of substitutents. The dyes possess high thermal stability coupled with strong absorption in the near infrared. The solubility of the dyes in useful organic solvents is high compared to many known phthalocyanine dyes and the tetrasubstituted dyes may be prepared from readily available starting materials at a fraction of the cost of the corresponding octasubstituted compounds, or the corresponding unsymmetrical tetra substituted dyes.

The dyes of the invention may readily be synthesised by either of the routes in the following reaction scheme:

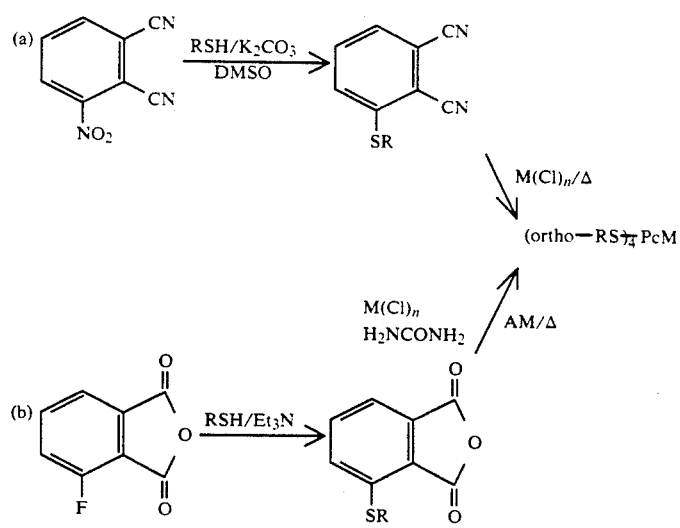

in which:
Pc represents the phthalocyanine nucleus
DMF represents dimethylformamide
DMSO represents dimethylsulphoxide
Et$_3$N represents triethylamine
AM represent ammoniummolybdate It has been found that the properties of tetrasubstituted phthalocyanines including absorption wavelength, extinction coefficient, and solubility are strongly dependent onthe temperature at which the phthalocyanine-forming reaction is performed. It is believed that this reflects different distributions of the possible geometric isomers, for example. tetra-ortho-(4-t-butylphenylthio) PcVO when prepared by method (a) at 250° C. has λmax 748 nm, E $1.8 \times 10^5$; the same dye when prepared by method b at 225° C. has λmax 750 nm, E $2.2 \times 10^5$. (c.f. the corresponding compound disclosed in Japanese Patent Application No. 63-149189 for which λmax of 818 nm is quoted).

Table 1 reports certain properties of dyes which have been prepared suitable for use in the optical recording elements of the invention. Comparative data is provided for analogous unsubstituted phthalocyanine dyes (Compound Nos. A and B) and a meta position tetrasubstituted phthalocyanine dye (Compound No. C).

Compound C is included as a comparative example for Dye 3 to illustrate the shift in absorption caused by meta position substituents, i.e., a shift of approximately 30 nm.

coating weights or optical density of the recording layer or element since the minimum amount will vary according to the dye, the thickness of the recording layer and the particular binder present. For example, a thick layer of recording medium having a high optical density and coating weight of dye may have inferior performance to a thin layer having a lower optical density and coating weight.

The thickness of the coated recording layer is an important factor in controlling the efficiency of the laser in forming pits since good writing sensitivity requires that writing energy be effectively coupled into the recording layer. A. E. Bell and F. W. Spong, I.E.E.E. Journal of Quantum Electronics, p.487, (Jul. 1978), discloses, that optimum write situations are generally obtained when the recording layer has a thickness about one quarter the wavelength of the recording light. In recording elements of the present invention

TABLE 1

| COMPOUND NO. | SUBSTITUENT | POSITION | METAL (M) | SOLUBILITY $C_6H_{12}$ | SOLUBILITY $CH_2Cl_2$ | λ MAX (soln) |
|---|---|---|---|---|---|---|
| A | None | — | VO | Nil | Nil | 695 |
| B | None | — | Mn | Nil | Nil | 712 |
| C | Tetra(4-t-butylphenylthio) | meta | VO | <1% | >1% | 718 |
| 1 | Tetra(phenylthio) | ortho | VO | <1% | >>1% | 745 |
| 2 | Tetra(phenylthio) | ortho | Mn | <1% | >1% | 781 |
| 3 | Tetra(4-t-butylphenylthio) | ortho | VO | <1% | >>1% | 748 |
| 4 | Tetra(4-t-butylphneylthio) | ortho | Mn | <1% | >>1% | 782 |
| 5 | Tetra(2-methoxyphenylthio) | ortho | VO | <1% | >1% | 749 |
| 6 | Tetra(n-octadecylthio) | ortho | VO | >1% | >>1% | 745 |
| 7 | Tetra(phenylseleno) | ortho | VO | <1% | >1% | 749 |

The optical recording elements of the invention are generally constructed in the form of a support having as a recording layer coated thereon, one or more dyes of general formula (I). In both A.I. and S.I. constructions of the optical recording elements the recording layer may be formed entirely of the phthalocyanine dye. However, the dyes are compatible with a wide range of polymeric binder materials and accordingly dye-in-binder recording layers may also be used. The binder material may comprise any material known to the art and is generally included in the recording layer to prevent detrimental crystallisation of the dye(s) when applied to the support as a thin layer.

There is no specific teaching in the art as to the type of binder which is most suitable for use in dye-polymer optical recording media. In general dye-polymer ablative systems are said to be superior to absorbing metal systems because of their low conductivity, low decomposition temperature and low melting point. Polymeric binders with low melting points are exemplified, together with binders of low or oligomeric weights as imparting high or increased sensitivity to the media. However, examples of thermoplastics having higher glass transition temperatures, e.g., polyesters, polycarbonates, poly(N-vinyl carbazole) appear in general lists of possible binders. Polyacenaphthylene, disclosed in European Published Patent Application No. 294969, and certain cross-linked binders, as disclosed in European Published Patent Application No. 307081, have been shown to impart improved repeated read properties.

The dye must be present in the region of the surface of the recording layer in a sufficient amount to absorb an effective amount of the exposing radiation to produce a detectable mark on the surface thereof. It is not possible to generally quantify the minimum amount of dye required for optical recording either in terms of sensitivity is improved as the thickness of the recording layer is reduced below 1 micron and in preferred embodiments the thickness is in the range from 30 to 400 nm, although a general range of 10 to 1000 nm may be used.

The recording layer is generally coated onto a substrate which acts as a support. The support may be substantially any solid material, either flexible or rigid including; polymeric materials, e.g., polyacrylates polyamides, polycarbonates, polyesters, polyolefins, polysiloxanes, polyurethanes and polyvinyl resins; ceramic or glass materials; fibrous materials and metals. The support must have a softening point high enough to avoid deformation during writing of information. Also the surface of the substrate which is to be coated should be smooth and free of random surface irregularities, although it may be flat, pre-grooved or may include predetermined surface irregularities capable of being read by laser light in the final element to provide an indexing function, tracking function, or the like. The substrate is typically in the form of a disc or plate. However, the optical recording elements of the present invention are also suitable for construction as optical cards or tape.

In one embodiment of the invention the substrate is transparent so that recording and reading can take place through the substrate. The substrate used for substrate incident construction can be made from a variety of materials as long as they are transparent at the operating wavelength of the laser. The use of an injection moulded polycarbonate disk is desirable for reasons of low birefringence and cost.

Preferably a reflecting layer is provided either between the substrate and the recording layer, or, if writing and reading is to take place through the substrate, on top of the recording layer. In A.I. constructions, the reflector layer acts as a solvent barrier layer preventing solvent attack on the underlying polycarbonate substrate. The absence of this layer in S.I. constructions has two consequences. First, either a less aggressive coating solvent (such as cyclohexane or a lower alcohol), or a replacement solvent resistant layer, must be used. Secondly, as the reflectivity of the dye itself may be insufficient to provide an acceptable signal, some methods of boosting the media reflectivity may be required. A preferred construction comprises a semi-reflecting layer interposed between the recording layer and the transparent substrate, as taught, for example, in Japanese Patent Application 60-157739. Suitable materials include aluminium, copper, chromium, gold and rhodium. The thickness of the light reflecting layer should be sufficient to reflect a significant amount of the recording light. Levelling and/or priming layers may also be applied to the substrate before application of the reflective coating and/or dye containing layer. If the reflecting material itself can be formed so it is a self-sustaining layer and optically smooth, it may constitute the substrate.

A recording element in which there is both a reflecting layer and the recording layer is termed a bilayer system. This can be expanded to a trilayer system by the insertion of a spacer between the reflecting layer and the recording medium. The spacer may confer smoothness, help control the thermal performance of the medium and protect the reflecting layer. A dielectric spacer may comprise vacuum deposited $SiO_2$, or an organic polymer which does not contain any of the light-absorbing dye. The dielectric spacer is preferably transparent to the laser beam used in reading and writing on the recording layer. Examples of the construction of such recording elements are disclosed in Bartolini et al., J. Quantum Electronics, 1981, page 69.

In a preferred S.I. construction a vapour coated layer or $SiO_2$ is used to protect the polycarbonate substrate. A thin, semi-transparent layer of copper is then deposited, so as to yield a controllable increase in reflectivity. The dyes of the invention coat well onto this construction, without dye crystallisation occurring. In some cases, a solvent-resistant layer is unnecessary, as for example with the cyclohexane-soluble dye, Compound No. 6.

In the recording elements of the present invention the recording information is carried in the form of marks; e.g. about 1 micron in size, in the recording layer. Because of the high density of the information, dust or other foreign materials on the top surface of the recording layer may cause significant errors. Therefore, in one embodiment of recording elements of the present invention a protective layer at least 0.6 microns thick is provided on top of the recording layer to separate dust and other particles from the recording layer. The laser beam is sharply convergent at the top surface of the recording layer and accordingly any dust particle on the protective layer would be out of focus with respect to the laser beam and thus not affect the reading and writing process. The protective layer can be made of any material which is transparent to laser beams used in reading and writing on the recording layer and it can either be directly in contact with the recording layer or separated from it by an air, nitrogen or vacuum gap. Suitable materials which can be used for the protective coating include glass, poly(methyl methacrylate), polycarbonates and polyesters.

The recording elements of the invention may be double-sided, comprising a planar substrate optionally in the form of a disc, having on each major surface a reflecting layer, above which is coated the recording medium and optionally a protective layer.

Other suitable constructions of optical recording elements are disclosed in The Design and Optimization of the Optical Data Disk, Alan E. Bell, Proceedings of the SID, Vol 24/1, 1983, pages 17 to 23.

For an element comprising a dye-in-binder recording layer the dye/binder ratio selected is a balance between one end of the range where a high dye/binder ratio leads to the possibility of undesirable crystallization, whilst at the other extreme too little dye may result in insufficient heat softening from the dye to the binder to cause ablation and hence prevent recording. Another limitation on increasing the dye/binder ratio is the solubility of the dye in the coating solution. In practice, dye/binder weight ratios may range from 1:30 to 5:1 and preferably from 1:20 to 2.5:1.

In order to achieve the desired dye/binder ratios in a coating solution and to obtain viscosities suitable for spreading, the solubility of the dye is preferably at least 10 mg/ml in the solvent chosen.

The solvent used for preparing the coating composition may be selected from a wide range of known solvents such as chlorinated solvents, e.g., dichloromethane, 1,2-dichloroethane, chloroform and, 1,2-dichloropropane or ketonic solvents, e.g., cyclohexanone, or aromatic solvents, e.g., xylene. Other solvents include ethanol, propanol, n-butanol, and cyclohexane. The solvents can be used alone or in combination, the choice being governed to some extent by the particular dye/binder system, by the method of coating used and the choice of substrate material.

Suitable methods of coating the composition include handcoating, dipcoating, spincoating and webcoating. A very suitable process is the centrifugal spincoating process. According to this process, the substrate to be covered is laid on a turntable and a quantity of solution is then provided on the substrate. By rotating the substrate, the liquid will spread circularly over the surface of the substrate. It has been found that very thin layers can be obtained by means of the centrifuging process, the thickness of which depends inter alia on the rotation speed of the substrate and the viscosity of the solution to be spread. It has been found that layers having a thickness smaller than 1 microns are obtained if the viscosity of the solution lies in the order of magnitude of a few centipoise, for example, up to 10 cP, and a speed of rotation is used of approximately 500 to 2500 rpm. The percentage of solid substance in the solution preferably should be low and generally be at most 5 to 10% by weight. Film thicknesses less than 0.3 microns can readily be achieved in this manner.

In an illustrative recording system embodying the principles of the present invention, a record blank comprising a substrate coated with a reflective layer, a recording medium of the invention and an optical protective layer, in the form of a disc is subjected to rotation at a constant rotational speed while a beam of light from a light source (e.g., a laser providing light at a wavelength at which the recording medium is absorbing) is focussed on the coated surface of the disc. The intensity of the light beam is controlled in accordance with information to be recorded. Illustratively, the control is effected in accordance with carrier waves modulated in frequency by picture-representative video signals, with the light beam intensity varying as a result between a high level sufficient to effect ablation of the absorptive material and a low level insufficient to effect such ablation, the frequency of the level alternations varying as the video signal amplitude changes.

Information tracks comprising a succession of spaced pits are formed in the coated surface of the disc, the pits appearing in those surface regions are formed by vaporization or melting of the absorptive layer material in response to the high level beam exposure. Variations in the length and separation of the pits are representative of the recorded information. Where a continuous sequence of pits is to be recorded, a spiral information track may be formed by providing relative motion, in a radial direction and at a constant rate during the recording between the recording beam and the rotating disc. Alternatively, in the absence of such relative motion during the recording, a circular information track may be formed.

The result of the above-described recording process is the formation of an information record in a form which facilitates recovery of the recorded information by optical playback process. The information trace of such an information record comprises undisturbed surface regions that exhibit very low reflectance to an appropriate light frequency, alternating with pit regions, formed by the ablation process, that exhibit appreciably high reflectance at the same light frequency. A high ratio between the reflectance of the pit regions and the reflectance of the intervening (undisturbed surface) regions is readily provided. Media exhibiting lower reflectively after writing may also be made.

In playback operations pursuant to the principles of the present invention, a light beam is focussed upon the information track of a rotating information record of the above described type. The playback beam has a constant intensity at a level insufficient to effect ablation of the disc coatings, and is of a frequency substantially corresponding to that at which the undisturbed surface regions exhibit an antireflection condition. A photodetector, positioned to receive light reflected from the successive regions of the information track as they pass through the path of the focussed light, develops a signal representative of the recorded information. A high readout contrast ratio (due to the large differences in reflectance of the pit regions and the intervening track regions, at the light frequency of the playback beam) is readily obtained, permitting recording of the recorded video signals with an excellent signal-to-noise ratio.

The invention will now be described with reference to the following Examples.

EXAMPLE 1

Preparation of 3-(4-t-Butylphenylthio) -1,2-Benzenedicarbonitrile

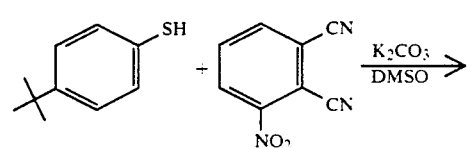

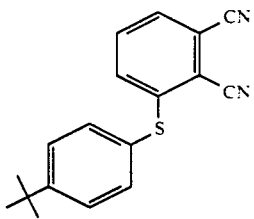

Anhydrous $K_2CO_3$ (6.510 g, 0.047M) was added in portions at 45 minute intervals over a period of 3h to a stirred solution of 4-t-butylthiophenol (5.1 g, 0.030M) and 3-nitro-1, 2-benzenedicarbonitrile (5.203 g, 0.030M) in dry DMSO (50 ml) at room temperature under nitrogen. After stirring for 24h, the reaction was worked up by filtration into a rapidly-stirred volume of water (15 ml). The suspension was acidified by addition of dilute hydrochloric acid, then extracted with $CH_2Cl_2$ (3 times). The combined extracts were washed with water (twice), dried ($MgSO_4$), and evaporated to give a yellow solid (7.39 g). The crude product was crystallised from cyclohexane (220 ml) to give 3-(4-t-butylphenylthio) -1,2benzenedicarbonitrile as faintly-coloured flakes (5.249g, 60%).

Melting Point: 152° to 153° C.
$^1$H NMR ($CDCl_3$) Chemical shift 7.49 (m,6), 7.10 (dd, 1, J=6Hz), 1.36 (s,9).
IR (Nujol)=2230 (C≡N) $cm^{-1}$.

EXAMPLE 2

Preparation of 3-(4-t-butylthiophenoxy)phthalic anhydride

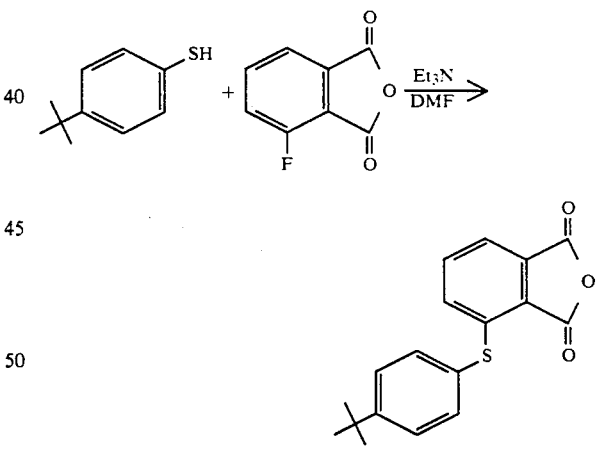

Following the method of Williams and Donahue in J. Org. Chem., 1978, 43, 255: dry triethylamine (6.70 ml, 48 mM) was added dropwise under nitrogen to a well-stirred solution of 3-fluorophthalic anhydride (7.03g, 44 mM) and 4-t-butyl-thiophenol (8.0g, 48 mM) in dry DMF (50 ml). The solution was stirred at room temperature for 3.5 hours, and then left to stand overnight before pouring into a well-stirred mixture of IM hydrochloric acid (400 ml) and ice (200g). The precipitate was collected by filtration, washed with ice cold IM hydrochloric acid and dried in vacuo over $P_2O_5$. The dry solid was recrystallised from toluene, to give the desired product as pale yellow needles, 7.08g (52%).

Melting Point: 169° to 171° C.

EXAMPLE 3

Preparation of 3-(n-Octadecylthio)-1,2-benzenedicarbonitrile carbonitrile

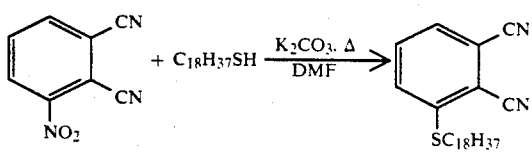

3-Nitro-1,2-benzenedicarbonitrile (1.731g, 0.01M), 1-octadecanethiol (2.866 g, 0.01M), anhydrous $K_2CO_3$ (7.0g) and DMF (20 ml) were stirred together at 75° to 80° C. for 6h, then allowed to stand cooling overnight. A solid mass formed on standing, which was dissolved in $CH_2Cl_2/H_2O$. An intermediate emulsion was removed by taking off as much of the organic phase as possible, then repeatedly extracting the residue with small portions of $CH_2Cl_2$. The combined $CH_2Cl_2$ extracts were washed with water (3 times), dried ($MgSO_4$), and evaporated in vacuo to give a solid (3.71g). Recrystallisation of the crude product from cyclohexane (150 ml) gave 3-(n-octadecylthio)-1,2-benzenedicarbonitrile as a faintly-coloured microcrystalline powder which was collected, washed with a little cold petrol, and dried in vacuo (3.220g, 78%).

$^1$H NMR ($CDCl_3$) Chemical shift 7.59 (m,3), 3.07 (t,2, J=7Hz), 1.26 (m, 35).

IR(Nujol)=2234 cm$^{-1}$ (C≡N).

EXAMPLE 4

Preparation of 3,6-Dithiophenoxy phthalic anhydride

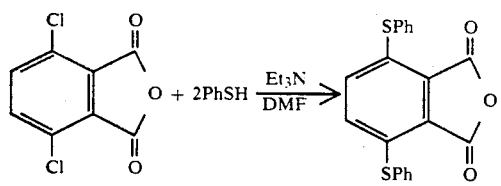

A solution of 3,6-dichlorophthalic anhydride (2.5g, 0.012M) and thiophenol (2.6 ml, 0.025M) in dry DMF (25 ml) was cooled to below 5° C. in an ice-water bath. A solution of triethylamine (3.8 ml, 0.027M) in dry DMF (10 ml) was then added dropwise over 15 minutes. After a further 1h the ice bath was removed and the mixture stirred at room temperature for 60 hours. The yellow suspension was then poured into a well-stirred mixture of ice (100g) and 1M hydrochloric acid (200 ml). After stirring for approximately 5 minutes, the precipitate was collected by filtration, washed well with ice-cold 1M hydrochloric acid and dried in vacuo at 40° C. over $P_2O_5$. The crude product was recrystallised from toluene to give the anhydride as yellow/orange prisms (2.71 g—first crop). Melting point: 215° to 217° C.

EXAMPLE 5

Preparation of Vanadyl tetra-ortho-{(4-t-butyl)thiophenoxy)phthalocyanine (Compound No. 3(a))

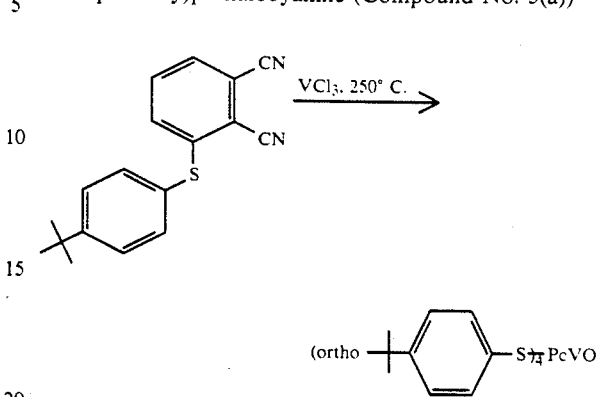

3-(4-t-Butylphenylthio)-1,2-benzenedicarbonitrile from Example 1 (2.047g, 7 mM) and $VCl_3$ (0.259 g, 1.65 mM) were placed together in a test tube which was then fitted with a rubber septum and flushed with a stream of nitrogen. The tube was immersed in a bath held at 250° C., and maintained at about 250° C. for 4h. A green intensely-coloured product was extracted from the cooled tube into hot chloroform. Solvent evaporation then gave the crude product as a solid (2.287g). This material was re-dissolved, and silica (11.5g) added to the solution. Solvent evaporation gave a powder which was introduced to the top of a column of silica 60 (40–63μ), and separated by flash chromatography using toluene as eluant to give the pure phthalocyanine Compound No. 3(a) as a green crystalline solid (0.709g, 35%).

Rf 0.47 (silica, toluene).

λmax ($CH_2Cl_2$)=748 nm ($\epsilon$=1.8×10$^5$).

In this and subsequent Examples, $\epsilon$ represents the molar extinction coefficient in units of liters mole$^{-1}$ cm$^{-1}$.

EXAMPLE 6

Preparation of Vanadyl tetra-ortho-{(4-t-butyl)thiophenoxy)phthalocyanine (Compound No. 3(b)}

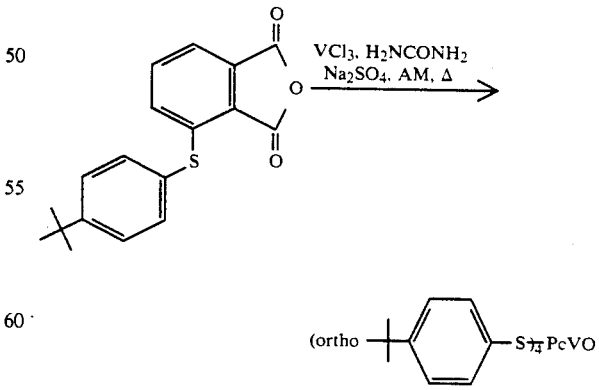

3-(4-t-butylthiophenoxy) phthalic anhydride from Example 2 (6.0g, 19 mM), vanadium trichloride (1.5g, 9.5 mM), urea (3.0g), sodium sulphate (6.0g) and ammonium molybdate (0.15g) were well mixed, one third of the mixture was placed in each of three test tubes. Each was then fitted with a rubber septum and flushed with a stream of nitrogen. The tubes were immersed in a bath held at 170° C. for 45 minutes, and then heated to about 225° C. for 3 hours. The cooled mixture was extracted from the test tubes, and stirred with warm (60° C.) water for 1 hour.

The suspension was filtered, the collected solid washed with hot water and dried. This solid was then stirred with dichloromethane (250 ml), the solution was filtered and concentrated in vacuo to give a green solid. This solid was purified by medium pressure chromatography over silica gel, using dichloromethane as the eluant, to give the desired product (1.03g. 20%).

λmax (dichloromethane) = 750nm ($\epsilon = 2.17 \times 10^5$).

The material is stable to 400° C., by Thermal Gravimetric Analysis.

EXAMPLE 7

Preparation of Manganese tetra-ortho-{(4-t-butyl) thiophenoxy)}phthalocyanine (Compound No. 4)

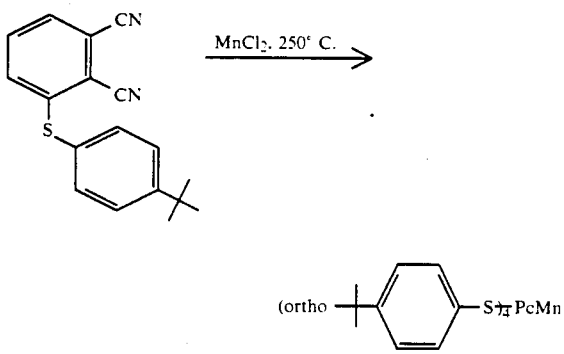

3-(4-t-Butylphenylthio)- 2-benzenedicarbonitrile from Example 1 (2.632 g, 9 mM) and MnCl$_2$. 4H$_2$O (0.435g, 2.2mM) were placed together in a test tube which was then fitted with a rubber septum and flushed with a stream of nitrogen. The tube was immersed in a bath held at 250° C., and maintained at about 250° C. for 6h. A red-brown intensely coloured product was extracted from the cooled tube into hot chloroform. Solvent evaporation then gave the crude product as a solid (2.330g).

Separation by MPLC on silica (40–73μ) using 1.5% MeOH in CH$_2$Cl$_2$ as eluant gave Compound No. 4 as a brown crystalline solid (1.335g, 50%).

Rf 0.32 (1.5% MeOH in CH$_2$Cl$_2$).
λmax (CH$_2$Cl$_2$) = 782nm ($\epsilon = 0.53 \times 10^5$).

EXAMPLE 8

Preparation of Vanadyl tetra-ortho-(noctadecylthio)phthalocyanine (Compound No. 6)

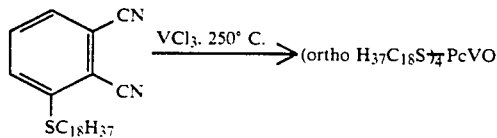

3-(n-Octadecylthio)-1,2-benzenedicarbonitrile from Example 3 (2.476g. 6 mM) and VCl$_3$ (0.236g, 15 mM) were placed together in a test tube which was then fitted with a rubber septum and flushed with a stream of nitrogen. The tube was immersed in a bath held at 240° C., and maintained at 240° to 250° C. for 4h. A green intensely coloured product was extracted from the cooled tube into hot chloroform. Solvent evaporation then gave the crude product as a solid (2.341g). This material was redissolved, and silica (12g) added to the solution. Solvent evaporation gave a powder which was introduced to the top of the column of silica (40–63μ), and separated by flash chromatography using toluene as eluant to give Compound No. 6 as a green crystalline solid (from hot ethanol) (0.921g, 36%)

λmax (CH$_2$Cl$_2$) = 745nm ($\epsilon = 1.29 \times 10^5$)

Melting Point: 135° to 140° C., stable to 350° C. Differential Scanning Calorimetry.

EXAMPLE 9

Preparation of 1,4,5,8,9,12,13,16-Octathiophenoxy vanadylphthalocyanine

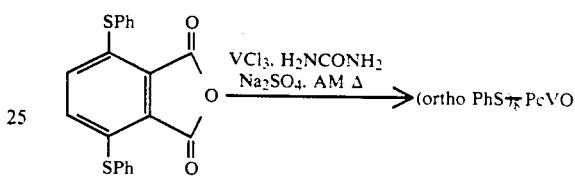

A mixture of 3,6-dithiophenoxy phthalic anhydride from Example 4 (1.82g, 5 mM), vanadium trichloride (0.39g, 2.5 mM), sodium sulphate (5.0g) urea (2.5g) and ammonium molybdate (0.01 g) was placed in a test tube and purged with nitrogen. The tube was then sealed with a septum and heated in a Wood's metal bath at 220° to 230° C. for 3.5h. After cooling to room temperature the solid residue was extracted from the tube, and stirred with dichloromethane (200 ml) for 30 minutes. The suspension was filtered and the filtrate evaporated to dryness. The residue was adsorbed onto silica gel and applied to the top of a silica column. The product was subsequently eluted with toluene. Evaporation of the toluene solution gave the desired product as a black/blue powder, 0.42g (6%).

λmax = 842nm ($\epsilon = 1.5 \times 10^5$).

EXAMPLE 10 TO 13

In each Examples, a solution of the appropriate dye, and in some cases additionally a polyurethane-forming binder, was spin-coated onto a grooved 5.25 inch polycarbonate substrate carrying an Al/Cr reflective layer. The disk was subsequently rotated at 1800 rpm and pits were written in the dye film at a radius of approximately 45 mm using a 10 mW laser beam at 830nm, modulated at 2.5 MHz with a 50% duty cycle square wave. The pits were repeatedly read back with the same laser operating at 1.2 mW. The carrier-to-noise ratio (CNR) measured with a 30kHz bandwidth, and the reflectivity level of the pits were monitored.

The following coating formulations were employed.

Example 10: A solution of Compound No. 3(a) at 0.8% w/v total solids in 4:1 1,2-dichloropropane: cyclohexanone spin-coated at 1000 rpm.

Example 11: A solution of Compound No. 4 at 0.8% w/v total solids in 4:1 1,2- dichloropropane: cyclohexanone spin coated at 800 rpm.

Example 12: A solution of 75% Compound No. 3(a) and 25% binder by weight at 1% w/v total solids in 4:1

1,2-dichloropropane: cyclohexanone spin-coated at 1000 rpm.

Example 13: A solution of 40% Compound No. D and 60% binder by weight at 0.94% w/v total solids in 4:1 1,2-dichloroethane: cyclohexanone spin-coated at 1300 rpm.

The binder used in Examples 12 and 13 was a 1:1 mixture of Desmodur L75 and Desmophen 650 a polyurethane forming composition commercially available from Bayer.

A lower dye:binder ratio was used in Example 13 because high dye:binder ratios using Compound No. D exhibit rapid CNR losses during repeated reading.

Compound No. D is

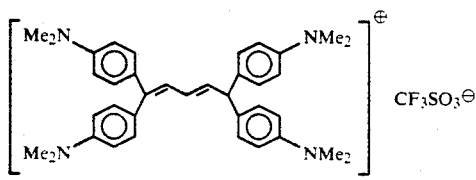

This dye is an example of the tetraaryl polymethine (TAPM) dyes disclosed in U.S. Pat. No. 4547444.

The results of the repeated read tests on the disks are reported in the following Table 2.

written using a laser power of 14 mW at a radius of approximately 30 mm with the laser being incident through the substrate.

The reflectivity levels of the pits and unwritten areas, and CNR value immediately after writing were 10.3%, 21.9% and 53.0dB respectively. After $2.1 \times 10^6$ reads, these values were 10.1%, 21.7% and 52.0dB. The data are plotted in the accompanying drawing, and show that the CNR of >50dB is maintained with virtually no change in reflectivity throughout the test.

EXAMPLE 15

A solution of 1% Compound No. 6 in 9:1 cyclo butanone was spin-coated at 800 rpm onto a grooved 5.25 inch polycarbonate substrate carrying an Al/Cr reflective layer. The disk was subsequently tested according to the method of Examples 10 to 13. The initial CNR was 47.5dB and the pit reflectivity level was 26.4%. After $3.2 \times 10^4$ reads, the final values were 48.5dB and 25.8%.

EXAMPLE 16

A solution of Compound No. 3(b) in 4:1 dichloropropane: cyclohexanone was spin-coated at 700 rpm onto a grooved 5.25 inch polycarbonate substrate carrying an Al/Cr reflective layer.

The disk was subsequently tested according to the

TABLE 2

| EXAMPLE NUMBER | COMPOUND NUMBER | % DYE | INITIAL CNR (dB) | 1 ΔdB/$10^5$ Rds | 2 ΔdB/$10^6$ Rds | 3 INITIAL PIT % R | 4 % R/$10^5$ Rds | 5 % R/$10^6$ Rds |
|---|---|---|---|---|---|---|---|---|
| 10 | 3(a) | 100 | 52.4 | 0.0 | — | 38.8 | +1.1 | — |
| 11 | 4 | 100 | 51.6 | −1.4 | — | 43.0 | −0.3 | — |
| 12 | 3(a) | 75 | 52.8 | −0.3 | −3.7 | 36.5 | −0.1 | +1.0 |
| 13 | D | 40 | 51.5 | −6.8 | −8.5 | 39.2 | +2.3 | +8.2 |

Notes
1 Change in CNR for $10^5$ reads.
2 Change in CNR for $10^6$ reads.
3 Initial pit reflectivity.
4 Change in pit reflectivity for $10^5$ reads.
5 Change in pit reflectivity for $10^6$ reads.

Initial values are recorded immediately after writing. Changes are calculated as final value (after $10^5$ or $10^6$ reads) minus initial value.

The above results demonstrate that a CNR is excess of 50dB is achievable with soluble phthalocyanine dyes of the invention and that the stability of both the CNR and reflectivity are superior to those of TAPM dyes. In addition, coatings containing a higher ratio of dye to binder, or even no binder at all, may be used with phthalocyanine dyes, so affording a greater scope to maximise the reflectivity of themedium. The use of dye-only coatings would also permit a vapour coating technique to be used in the fabrication of the optical recording medium.

EXAMPLE 14

A solution of Compound No. 3(a) was made up as in Example 10 and spin-coated at 1600 rpm onto a grooved 5.25 inch polycarbonate substrate carrying a partially transmissive copper layer approximately 7.5 nm thick.

The disk was subsequently tested according to the method of Examples 10 to 13, except that the pits were method of Examples 10 to 13. The initial CNR was 53.9dB and the pit reflectivity level was 37.3%. After $4.1 \times 10^4$ reads, the final values were 54.0dB and 37.4%.

EXAMPLE 17

The thermal stability of Compound No. 3(a) was compared with:

Compound D: a tetra-arylpolymethine dye used in Example 13,

Compound E: 1,4 5,8,7,12,13,16-[octa(phenylthio)]PcVO, a compound disclosed in Japanese Kokai 61-246091.

Compound F: a compound disclosed in German Patent Application No. 3 446 418:

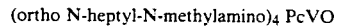

(ortho N-heptyl-N-methylamino)$_4$ PcVO

The results are reported in the following Table 3 and clearly indicate the superior thermal stability of the dye of the invention.

TABLE 3

| COMPOUND NUMBER | APPROX. DECOMP.* TEMP. °C. (TGA) | % LOSS IN FILM ABSORBANCE (250° C., 2h) | | |
|---|---|---|---|---|
| | | at 800 nm | at 820 nm | at 830 nm |
| 3(a) | 400 | 0.0 | 0.0 | 0.0 |
| D | 250 | 95.0 | 94.8 | 94.9 |
| E | 100 | decomposes | decomposes | decomposes |

TABLE 3-continued

| COMPOUND NUMBER | APPROX. DECOMP.* TEMP. °C. (TGA) | % LOSS IN FILM ABSORBANCE (250° C., 2h) | | |
|---|---|---|---|---|
| | | at 800 nm | at 820 nm | at 830 nm |
| F | 250 | 58.7 | 58.6 | 60.5 |

*Onset of decomposition as detected by Thermal Gravimetric Analysis

What is claimed is:

1. An optical recording element comprising a substrate and as a recording medium a layer comprising a dye having a nucleus of general formula (I)

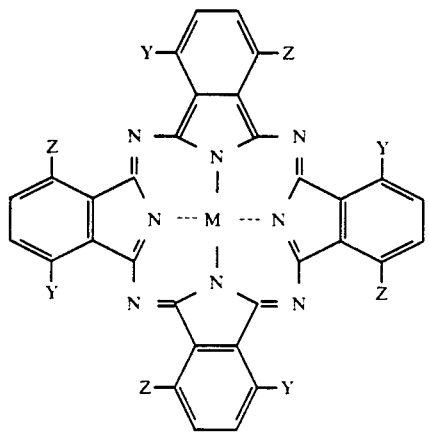

wherein;
each Y and Z is independently selected from the group consisting of hydrogen and —XR wherein X is selected from the group consisting of S, Se and Te and R represents an organic radical; with the proviso that one and only one of Y and Z on each phenyl ring must be other than H, and
( M is selected from the group consisting of two hydrogen atoms, metals and metal oxides.

2. An optical recording element according to claim 1 wherein M is sclected from the group consisting of Cu, Ni, Pb, VO, TiO, Nb, Ta, Pd, Sn, Cr, Mn, Fe and Co.

3. An optical recording element according to claim 2 wherein M is selected from the group consisting of Mn and VO.

4. An optical recording element according to claim 1 wherein X represents a sulphur atom.

5. An optical recording element according to claim 1 wherein each R is independently selected from the group consisting of:
monovalent aliphatic radicals comprising from 1 to 20 carbon atoms each of which radicals may possess one or more substituents selected from the gorup consisting of alkoxy, alkylthio groups comprising up to 5 carbon atoms, aryl groups comprising up to 10 carbon atoms, a cyano moiety and halogen atoms;
monovalent alicyclic radicals comprising from 4 to 8 carbon atoms, each of which radicals may possess one or more substituents selected from the group consisting of alkoxy, alkylthio groups comprising up to 5 carbon atoms, aryl groups comprising up to 10 carbon atoms, a cyano moiety and halogen atoms, and
monovalent aromatic radicals comprising up to 14 ring atoms selected from the gorup consisting of C, N, O, S and Se, each of which radicals may possess one or more substituents selected from the gorup consisting of: alkyl, alkenyl, alkylthio, alkylsulphonamide, alkylsulphone and alkylsulphoxide groups comprising up to 5 carbon atoms; aryl, arylthio, arylsulphonamide, arylsulphone and arylsulphoxide groups comprising up to 10 carbon atoms; aralkyl groups comprising up to 15 carbon atoms; hydroxyl, cyano, nitro, and carboxyl moieties and primary, secondary and tertiary amine groups.

6. An optical recording element according to claim 5 wherein each R is independently selected from the group consistinf of alkyl groups comprising up to 20 carbon atoms, alkenyl groups comprising up to 20 carbon atoms and homocyclic radicals comprising from 4 to 8 carbon atoms.

7. An optical recording element accoridng to claim 5 wherein each R is independently selected from the group consisting of alkyl groups comprising from 4 to 18 carbon atoms, cyclohexyl, phenyl, napthyl, naphth-2-yl, pyridyl, thiophenyl, furyl, pyrimidyl and benzothiazolyl groups, each of which may possess one or more substituents selected from the group conssiting of methyl, ethyl, methoxy, ethoxy, methylthio, alkyl, trifluoromethyl, bromine, chlorine, fluorine, phenyl, —COOH, —COOCH$_3$, —COOCH$_2$C$_6$H$_5$, —NHSO$_2$CH$_3$, —CO$_2$C$_6$H$_5$, —NH$_2$, —NHC$_2$H$_5$ and —N(CH$_3$)$_2$.

8. An optical recording element according to claim 1 wherein the recording medium additionally comprises a binder.

9. An optical recording element according to claim 1 wherein the surface of the substrate to which the recording layer is applied is light reflective.

10. An optical recording element according to claim 1 wherein a reflecting layer is interposed betwen the recoridng layer and substrate.

11. An optical recording element according to claim 1 wherein the substrate is transparent to visible and near infra-red radiation and a semi-reflective layer is interposed between the substrate and the recording layer.

12. An optical recording element according to claim 1 wherein a dielectric layer is interposed between the recording layer and substrate.

13. An optical recording element according to claim 1 wherein the substrate is substantially free from random surface irregularities and having on each major surface thereof a reflecting layer above which is coated the recording layer.

14. An optical recording element according to claim 1 wherein the top surface of the recording medium is protected by an overcoat layer of material transparent to near infrared, radiation which overcoat layer is either directly in contact with the top surface of the recording medium or separated from it by a clean sealed air, nitrogen or vacuum gap.

* * * * *

UNITED STATES PATENT AND TRADEMARK OFFICE
CERTIFICATE OF CORRECTION

PATENT NO. : 5,168,031

DATED : December 1, 1992

INVENTOR(S) : Buckingham et al.

It is certified that error appears in the above-identified patent and that said Letters Patent is hereby corrected as shown below:

| | |
|---|---|
| Drawing | add -- % R -- to left side of drawing |
| Col. 6, line 63 | "represent ammoniummolybdate" should be -- represents ammonium molybdate -- |
| Col. 6, line 67 | "onthe" should be -- on the -- |
| Col. 12, line 14 | "5.1g" should be -- 5.00g -- |
| Col. 13, line 6 | "carbonitrile" should be deleted |
| Col. 14, line 46 | "(Compound No. 3(b)}" should be -- (Compound No. 3(b)) -- |
| Col. 15, line 20 | "thiophenoxy)}" should be --thiophenoxy}-- |
| Col. 15, line 37 | "Butylphenylthio)- 2-" should be -- Butylphenylthio)-1, 2- -- |
| Col. 15, line 66 | "15" should be -- 1.5 -- |
| Col. 16, line 48 | "In each Examples" should be -- In each of these Examples -- |
| Col. 17, line 52 | "themedium" should be -- the medium -- |
| Col. 18, line 13 | "cyclo" should be -- cyclohexane: -- |
| Col. 19, line 38 | "( M" should be -- M -- |
| Col. 19, line 54 | "gorup" should be -- group -- |
| Col. 19, line 66 | "gorup" should be -- group -- |
| Col. 20, line 11 | "gorup" should be -- group -- |
| Col. 20, line 22 | "consistinf" should be -- consisting -- |
| Col. 20, line 32 | "conssiting" should be -- consisting -- |
| Col. 20, line 36 | "$-CO_2C_6H_5$" should be -- $SO_2C_6H_5$ -- |

UNITED STATES PATENT AND TRADEMARK OFFICE
CERTIFICATE OF CORRECTION

PATENT NO. : 5,168,031

DATED : December 1, 1992

INVENTOR(S) : Buckingham et al.

It is certified that error appears in the above-identified patent and that said Letters Patent is hereby corrected as shown below:

Col. 20, line 46    "recoridng" should be -- recording --

Signed and Sealed this

Fifteenth Day of February, 1994

Attest:

BRUCE LEHMAN

Attesting Officer

Commissioner of Patents and Trademarks